United States Patent [19]

Wang

[11] Patent Number: 5,061,780

[45] Date of Patent: Oct. 29, 1991

[54] POLY(ETHER-BIS-IMIDE-SPIRO DILACTAM) POLYMER

[75] Inventor: Pen-Chung Wang, Houston, Tex.

[73] Assignee: Shell Oil Company, Houston, Tex.

[21] Appl. No.: 564,524

[22] Filed: Aug. 9, 1990

[51] Int. Cl.$^5$ ............................................. C08G 73/06
[52] U.S. Cl. .................................... 528/170; 528/173; 528/183; 528/322; 528/323; 528/423
[58] Field of Search ............... 528/170, 322, 323, 173, 528/183, 423

[56] References Cited

U.S. PATENT DOCUMENTS

| | | | |
|---|---|---|---|
| 3,838,097 | 9/1974 | Wirth et al. | 260/49 |
| 3,852,242 | 12/1974 | White | 260/47 |
| 3,855,178 | 12/1974 | White et al. | 360/45.7 |
| 3,920,697 | 11/1975 | Takekoshi | 260/326 |
| 4,024,110 | 5/1977 | Takekoshi | 260/47 |
| 4,314,047 | 2/1982 | Banucci et al. | 528/26 |
| 4,330,666 | 5/1982 | White et al. | 528/14 |

Primary Examiner—Harold D. Anderson

[57] ABSTRACT

Novel poly(etherimide) polymers and a method for the production thereof, which polymers are characterized by moieties of a dioxyaryl-substituted 1,6-diaza [4,4] spirodilactam, alternating with moieties of a bis(imide) and, optionally, with moietis of a di(oxyphenyl) compound. The polymers are thermoplastic polymers of relatively high glass transition temperature.

29 Claims, No Drawings

POLY(ETHER-BIS-IMIDE-SPIRO DILACTAM) POLYMER

FIELD OF THE INVENTION

This invention relates to a novel class of thermoplastic poly(etherimide) polymers. More particularly, the invention relates to novel polymers containing ether moieties of a dioxyaryl-substituted 1,6-diaza [4.4] spirodilactam alternating with moieties of a bis(imide) and, optionally, with moieties of a di(oxyphenyl) compound.

BACKGROUND OF THE INVENTION

The class of polyimide polymers is known in the art, incorporating a variety of connecting structures around a central bis(imide) portion. Poly(etherimide) polymers are produced by White et al., U.S. Pat. No. 4,330,666, by use of a hydroxypyridine or an aminocarboxylic acid as catalyst. Similar poly(etherimide) polymers are disclosed by Banucci et al., U.S. Pat. No. 4,314,047. Various poly(etherimide) polymers are also prepared from a bis(nitroimide) and an alkali metal salt of a bis(oxyaryl) compound as disclosed in U.S. Pat. Nos. 3,838,097, 3,852,242, 3,855,178, 3,920,697, 4,024,110 and the like.

The class of polyimide polymers broadly is a class of thermoplastic polymers and certain of the polyimide polymers are easily processed by conventional methods used for the processing of other thermoplastics. Some polyimides, however, are processed only with difficulty. Certain of the polyimides are characterized by good mechanical properties including flexibility but others are deficient in such properties. Some polyimide polymers offer good solvent resistance to common solvents likely to be encountered whereas other polyimide polymers tend to be at least partially soluble in such solvents as chloroform, cresol or hydrocarbon solvents.

It would be of advantage to provide a class of poly(etherimide) polymers which provide good processability as well as satisfactory solvent resistance.

SUMMARY OF THE INVENTION

This invention relates to a novel class of poly(etherimide) polymers having amide as well as imide functionality. More particularly, the invention relates to a process of producing such a novel class of polymers, characterized by alternating moieties of a dioxyaryl-substituted 1,6-diaza [4.4] spirodilactam and, optionally, moieties of a di(oxyphenyl) compound, providing ether functionality, and of a bis(imide), which provides imide functionality.

DESCRIPTION OF THE INVENTION

The polymer product of the invention is a linear poly(etherimide) polymer wherein (1) moieties of a dioxyaryl [4.4] spirodilactam having ring nitrogens in the 1- and 6-ring positions and connected to the adjoining polymer components through an oxyaryl substituent on each ring nitrogen atom, which spirodilactam comprises the residue of the spirodilactam bisphenol, that is, the oxyaryl-spirodilactam moiety represented by the removal of the hydrogen atoms of the hydroxy groups in a spirodilactam formula I

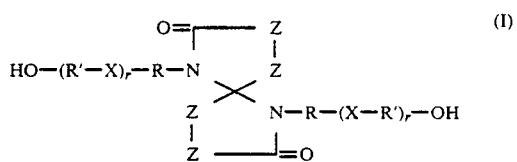

wherein Z, R, R', X and r each has the subsequently stated meaning. alternate with (2) a bis(imide) moiety which includes a residue of a dicarboxylic acid anhydride combined with nitrogen atoms of a primary diamine, i.e., the bis(imide) moiety represented by the formula II

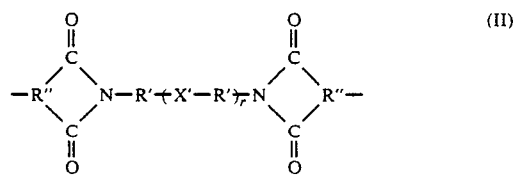

wherein R', R", r and X' have the subsequently stated meanings, and (3) optionally, with moieties of a di(oxyphenyl) compound, represented by the removal of the hydrogen atoms of the hydroxy groups in a di(hydroxyphenyl) compound of the formula X

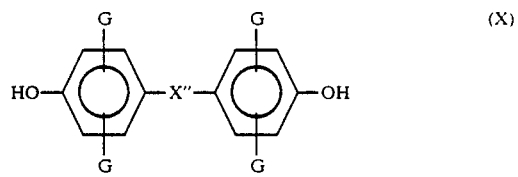

wherein G and X" have the subsequently stated meanings. In terms of the preferred reactants as defined above, the poly(etherimide) polymer is represented by a first repeating segment of the formula III

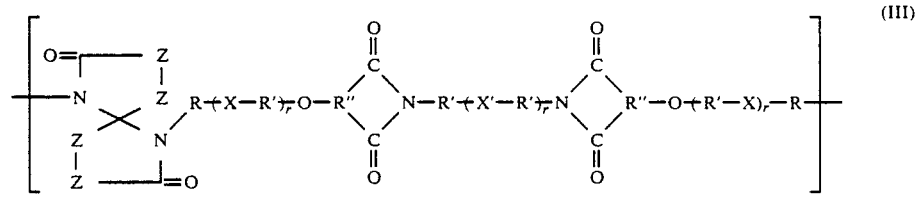

The process for the production of the poly(etherimide) polymers of the invention comprises the reaction of a bis(nitroimide) with a dihydroxyaryl-spirodilactam alkali metal salt and, optionally, with a di(hydroxyphenyl) compound alkali metal salt.

and optionally containing a second repeating segment of the formula IV

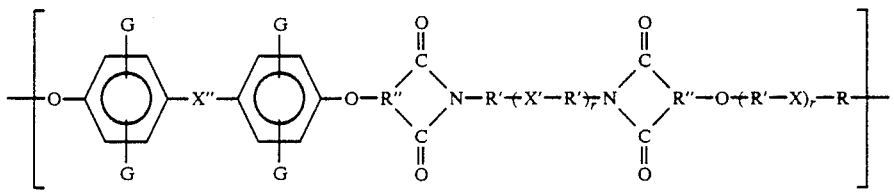

wherein G, Z, R, R', R", X, X', X" and r have the subsequently stated meanings. It will be apparent from the formula of the polymer product that the units of the polymer which are dioxyary-spirodilactam moieties are also properly considered as ether groups and the units of the polymer which incorporate bis(imide) moieties are imide units. Such polymers will typically have a molecular weight of from about 1,000 to about 100,000, more typically from about 10,000 to about 50,000. When both III and IV are present, the ratio of the randomly found segments as defined by III and IV is the ratio of III:IV of from about 95:5 to about 5:95 but preferably from about 3:1 to about 1:3. By linear is meant that the polymer chain produced resembles a line that is essentially unbranched.

The nomenclature of the polymer product is not easily determined or understood, but the identity of the products will be apparent from the above formulas for the reactants and for the product. Preferred polymers are those wherein each r is O and R is phenylene, particularly 4-phenylene. An illustrative polymer is obtained by reaction of (1) an alkali metal salt of a dihydroxyaryl-substituted spirodilactam prepared from a 4-oxoheptanedioic acid or 1,6-dioxaspiro[4.4]nonane-2,7-dione with (2) a bis(nitroimide) prepared from a primary diamine such as 1,3-di(amino)phenylene or di(4-aminophenyl) ether and an aromatic nitro-dicarboxylic acid anhydride, such as nitrophthalic anhydride. In each case, an alkali metal salt of a di(hydroxyphenyl) compound, such as 2,2-di(hydroxyphenyl)propane, can also be present.

The poly(etherimide) polymer is obtained by methods well known in the art, including those set forth in U.S. Pat. No. 4,720,540. For example, the polymer is obtained by contacting the dihydroxyaryl-spirodilactam alkali metal salt with the bis(nitroimide) and, optionally, with an alkali metal salt of a di(hydroxyphenyl) compound, under polymerization conditions in the presence of a liquid-phase reaction diluent. For example, to obtain the products of the above formula III, the molar ratio of spirodilactam salt to bis(nitroimide) should be from about 95:5 to about 5:95 but preferably from about 3:1 to about 1:3. The bis(nitroimide) should be provided in a molar quantity at least about equal to the total molar quantity of spirodilactam salt.

The reaction diluent is a diluent which is liquid under polymerization conditions and in which the reactants are at least partially soluble at reaction temperature. Additionally, the reaction diluent should be relatively high boiling and inert to the reactants and the polymer product under reaction conditions. Suitable reaction diluents include N-alkylamides such as N,N-dimethylacetamide. N,N-dimethylformamide, and N-methyl-2-pyrrolidone; sulfur-containing diluents such as dimethyl sulfoxide and sulfolane; and glycols such as ethylene glycol and trimethylene glycol. The polymerization is conducted under polymerization conditions at an elevated temperature. Suitable reaction temperatures are from about 140° C. to about 250° C., preferably from about 50° C. to about 150° C. Reaction pressures are satisfactory if sufficient to maintain the reaction mixture in a liquid phase. Such pressures are often up to 20 atmospheres but more often are from about 0.8 atmospheres to about 10 atmospheres.

The reaction is conducted by charging the reaction mixture components to a suitable reactor and maintaining reactant contact by conventional methods such as shaking, stirring or refluxing while the reaction mixture is maintained at polymerization conditions. It is advantageous to remove water present or formed during reaction by such means as selective extraction or distillation, preferably azeotropic distillation with a portion of the reaction diluent or a second reaction diluent with which water forms an azeotrope, e.g., toluene or ethylbenzene. Subsequent to reaction the polymer product is removed by conventional methods such as extraction, solvent removal or precipitation.

Although lithium, sodium, potassium, rubidium or cesium salts of the hydroxyaryl-substituted spirodilactams are usefully employed in the production of the invention, the use of a sodium salt or a potassium salt is preferred. In one embodiment the alkali metal salt of the dihydroxyaryl-substituted spirodilactam is produced by contacting the spirodilactam with a stoichiometric quantity of an alkali metal hydroxide or carbonate, e.g., substantially 2 moles of alkali metal hydroxide per mole of spirodilactam. Sodium hydroxide or potassium hydroxide is preferred. Reaction is conducted in the liquid phase in a suitable reaction solvent such as N,N-dimethylacetamide or N,N-dimethylformamide while removing the water present or formed by distillation preferably azeotropic distillation employing a second solvent such as toluene or ethylbenzene with which water forms an azeotrope. The alkali metal salt of the dihydroxyaryl substituted spirodilactam is isolated if desired by conventional methods such as solvent removal but the salt is typically used in situ in the media of its production for the reaction with the compound containing the unsaturated moiety. Alternatively, however, the alkali metal salt is produced in situ by providing the hydroxyaryl-substituted spirodilactam to the reaction mixture and adding a sufficient amount of an alkali metal hydroxide, carbonate or bicarbonate to neutralize the spirodilactam. In this embodiment it is useful to add a second solvent with which the water present or formed during neutralization is removed as an azetrope. Toluene and ethylbenzene are illustrative of suitable azeotropic distillation solvents.

The poly(etherimide) polymer is a thermoplastic polymer of relatively high glass transition temperature, typically above 200° C. or even higher. The polymer is useful for the applications typically associated with thermoplastic polymers and is processed by known methods such as extrusion or injection molding into sheets, films, fibers or molded articles which demonstrate resistance to common solvents. Because of the relatively high glass transition temperatures exhibited by the polymer products, they are additionally useful as engineering thermoplastics for applications where elevated temperatures are likely to be encountered. Such applications include the production of containers for food and drink, base materials for electrical and electronic applications and both external and internal parts for automotive applications.

Spirodilactam bisphenol

The dihydioxyaryl-spirodilactam salt is the salt of the reaction product of a spirodilactam precursor selected from a ketodicarboxylic acid compound or a 1,6-dioxaspiro[4.4]nonane-2,7-dione compound which will react with the hydroxy-containing primary amine compound to produce [4.4] spirodilactam groups having oxyary substituents on each spiro ring nitrogen atom in the 1- and 6- positions of the spirodilactam structure. Such process is described in U.S. Pat. No. 4,939,251, the disclosures of which are incorporated herein by reference.

In one embodiment of the spirodilactam precursor, the precursor is a ketodiacid of up to 30 carbon atoms, inclusive, having two carbon atoms between the keto group and each carboxy function. In other terms, the ketodiacid compound is a 4-oxoheptanedioic acid compound. Although a variety of such ketoacid compounds having a variety of substituents in addition to the oxo moiety and the carboxy functions are useful in the invention, the preferred 4-oxoheptanedioic acid compounds are represented by the formula VI

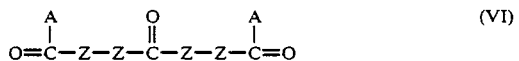

wherein A independently is hydroxy, alkoxy, preferably lower alkoxy of up to 4 carbon atoms inclusive, or halo, preferably the middle halogens chloro or bromo, and Z independently is >C(Z')$_2$ in which Z' independently is hydrogen, lower alkyl, e.g., of 1 to 4 carbon atoms, preferably methyl, halo, preferably the lower halogens, fluoro or chloro, or aryl of up to 10 carbon atoms, preferably phenyl, or Z is such that two adjacent Z moieties taken together form a ring system of Z" of 1 to 3 rings, each ring of from 5 to 7 ring atoms inclusive, up to two of which are hetero atoms selected from nitrogen, oxygen or sulfur with the remainder of the ring atoms being carbon atoms, there being up to 15 carbon atoms in each Z", two of which form a bridge between the carbon atoms connected by the adjacent Z groups. When the Z moieties are linked together to form a ring system the ring system is aromatic, cycloaliphatic or heterocyclic and is hydrocarbyl containing only atoms of carbon and hydrogen besides any heteroatoms or substituted hydrocarbon containing additional atoms such as halogen, preferably middle halogen, in the form of inert carbon atom substituents.

In one embodiment employing the ketodiacid compound spirodilactam precursor, each Z moiety is >C(Z')$_2$ and the ketodiacid compound is an 4-oxoheptanedioic acid compound. In one such embodiment, largely because of a particularly convenient method of producing the spirodilactam precursor, a preferred 4-oxoheptanedioic acid compound has at least one hydrogen on the carbon atom adjacent to each carboxy function, that is, at least one Z' on each carbon atom adjacent to a carboxy function is hydrogen. Such 4-oxoheptanedioic acid compounds are represented by the formula VIa

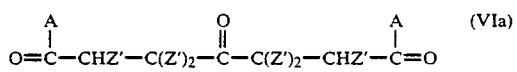

wherein Z' and A have the previously stated meanings. Such 4-oxoheptanedioic acid compounds include 4-oxoheptanedioic acid, dimethyl 4-oxoheptanedioate, 2,6-dimethylheptanedioic acid, 2,3,5,6-tetramethyl-4-oxoheptanedioyl chloride, di-n-propyl 2,6-di-n-butyl-4-heptanedioate and 7-carbomethoxy-3,3,5,5-tetramethyl-4-oxohexanedioic acid. The preferred ketodiacids of the above formula Ia are those wherein each Z' is hydrogen or methyl, especially hydrogen, and each A is hydroxy or methoxy, especially hydroxy.

These ketodiacid compounds are known compounds or are produced by known methods, but the esters of formula VIa, i.e., the compounds wherein A is alkoxy, are produced by reaction of formaldehyde with an α,β-ethylenically unsaturated carboxylic acid ester such as methyl acrylate, ethyl methacrylate, methyl crotonate, methyl ethacrylate and propyl 2,3-dimethylbutanoate. This reaction is conducted in the presence of a catalyst system which comprises a thiazolium salt and a tertiary amine and produces the dialkyl 4-oxoheptanedioate derivative in good yield. This process is described in greater detail in U.S. Pat. No. 4,800,231, incorporated herein by reference. Conversion of the esters thereby obtained to free acids or acid halides is by conventional methods as is the general interconversion of the acids, esters or acid halides of formula VIa.

In a second embodiment of the ketodiacid compound spirodilactam precursor, the 4-ketodiacid incorporates cyclic moieties between the keto group and the carboxy functions. i.e., two adjacent Z moieties form a fused cyclic ring structure Z". Such diacid compounds are represented by the formula VIb

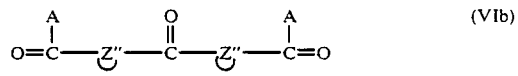

wherein A and Z" have the previously stated meanings. Illustrative of these cyclic ketodiacid compounds are di(2-carboxycyclohexyl) ketone, di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-2-pyrryl ketone, di(3-carbethoxy-2-morpholyl) ketone and di(3-carbomethoxy-2-naphthyl) ketone. The preferred cyclic ketodiacid compounds of formula Ib are those wherein each Z" is a ring system of from 5 to 6 carbon atoms, inclusive, and up to one nitrogen atom, particularly benzo.

Such ketodiacids are known compounds or are produced by known methods, such as the method of U.S. Pat. No. 1,999,181 or the method of Cava et al., *J. Am. Chem. Soc.*, 77, 6022 (1955).

In yet another embodiment of the diketone compound spirodilactam precursor, the ketodiacid incorporates one fused cyclic moiety with the remainder of the Z moieties being >C(Z')$_2$, i.e., the compounds are of the formula VIc

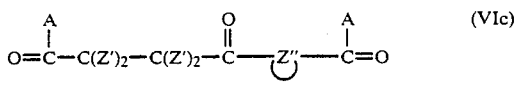

(VIc)

wherein A, Z' and Z" have the previously stated meanings. Such ketodiacids of one cyclic moiety are illustrated by 3-(2-carboxybenzoyl)propionic acid, 3-(2-carbomethoxy-2-pyridyloyl)-2-ethylpropionic acid, ethyl 3-(2-carbethoxybenzoyl)propionate and 3-(2-carboxy-4-methylbenzoyl)butyrl chloride. The ketodiacids of the above formula VIc are known compounds or are produced by known methods. For example, 2-carboxymethylbenzaldehyde reacts with methyl acrylate according to the general teachings of to U.S. Pat. No. 4,800,231 produce methyl 3-(2-carbomethoxybenzoyl)propionate.

In a second embodiment of the invention, the spirodilactam precursor is a 1,6-dioxaspiro[4.4]nonane-2,7-dione compounds wherein the spiro ring system is substituted with hydrogen, alkyl or halogen, or which incorporates fused cyclic substituents which include the 3- and 4- spiro ring positions and/or the 8- and 9- spiro ring positions of the spiro ring system. One class of such [4.4] spirodilactones is represented by the formula VII

(VII)

wherein Z has the previously stated significance.

In the embodiment of these spirodilactone spirodilactam precursors of the above formula VII wherein each Z is $>C(Z')_2$, the spirodilactone is represented by the formula VIIa

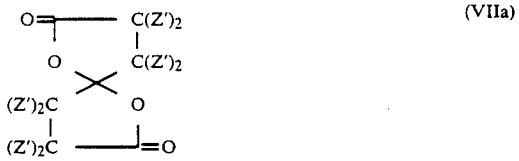

(VIIa)

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4]-nonane-2,7-dione, 4,9-diphenyl-1,6-diazospiro[4.4]nonane-2,7-dione, 3,3,8,8-tetramethyl-1,6-dioxaspiro[4.4-]nonane-2,7-dione, 3,3,4,4,8,8,9,9-octa-methyl-1,6-dioxaspiro[4.4]nonane-2,7-dione and 3,4,8,9-tetrafluoro-1,6-di-oxaspiro[4.4]nonane-2,7-dione. The preferred spirodilactones of the above formula VIIa are those wherein at least one Z' of each Z'-substituted carbon atom is hydrogen.

The compounds of formula VIIa are known compounds or are produced by known methods such as the process of Pariza et al., *Synthetic Communications*, Vol. 13(3), pp. 243-254 (1983), herein incorporated by reference.

In the embodiment of the spirodilactone spirodilactam precursors of the above formula II which incorporate a fused cyclic moiety as a part of the two rings of the spiro ring system, the spirodilactones are represented by the formula VIIb

(VIIb)

wherein Z" has the previously stated meaning. Typical compounds of this formula VIIb are 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(4-methylbenzo)-1,6-dioxaspiro4.4]nonane-2,7-dione and 3,4,8,9-di(pyride)-1,6-dioxaspiro[4.4]nonane-2,7-dione. These compounds are known compounds or are produced by known methods, for example, the process of the above Cava et al article or by the process of U.S. Pat. No. 1,999,181.

In another embodiment of the spirodilactone spirodilactam precursor, a cyclic moiety is fused to one spiro ring and the other spiro ring is free from fused ring substituents. Such spirodilactones are represented by the formula VIIc

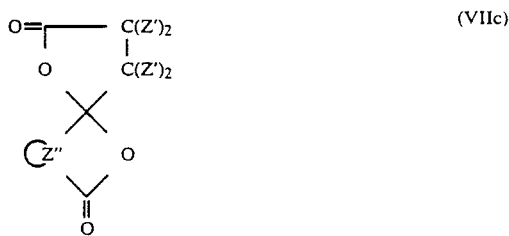

(VIIc)

wherein Z' and Z" have the previously stated meanings. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione, and 3,3,4,4-tetramethyl-8,9-morphols-1,6-diazaspiro[4.4]nonane-2,7-dione. The spirodilactones of the above formula VIIc are produced by known methods, for example, the dehydration of the corresponding ketodiacid. By way of illustration, 3,4-benzo-1,6-dioxaspiro[4.4]nonane-2,7-dione is produced by dehydration of 3-(2-carboxybenzoyl)propionic acid through application of heat.

In general, the preferred spirodilactone spirodilactam precursors are hydrocarbon except for the oxygen atoms of the lactone moieties and particularly preferred are those spirodilactones which are free from fused ring substituents (formula VIIa) or those which have a fused ring substituent on each of the spiro rings (formula VIIb). An especially preferred spirodilactone spirodilactam precursor of the first class is 1,6-dioxaspiro[4.4-]nonane-2,7-dione while a preferred spirodilactone of the latter class is 3,4,8,9-dibenzo-1,6-dioxaspiro[4.4]nonane-2,7-dione.

Such spirodilactam precursors to compounds containing the Z" ring are known compounds or are produced by known methods including the method described by Conover et al., U.S. Pat. No. 1,999,181, Cava et al., *J. Am. Chem. Soc.*, 77, 6022 (1955), or Gourmelon et al., *Bull. Soc. Chem.*, 4032 (1971). Such methods include (1) in Conover et al., the decarboxylation of dicarboxylic acid anhydrides in the presence of known decarboxylation catalysts, (2) in Cava et al., the chromic acid oxidation of cyclic (aryl) substituted dicyclic diarylene) compounds, and (3) in Gourmelon et al., the Friedel Crafts condensation of cyclic (aryl) acid with cyclic (aryl) dicarboxylic anhydride. Other methods include Cava et al., *J. Am. Chem. Soc.*, 79, 1706 (1957), in which a fused ring-cyclobutene dibromide is treated with potassium hydroxide followed by oxidation with chromic acid in acetic acid, and Sikes et al., *Meeting Am. Chem. Soc.*, April 1988, p. 614, in which an aryl, magnesium bromide, e.g., o-tolyl magnesium bromide, is reacted with an excess of a dicarboxylic acid anhydride in benzene-ether solution followed by oxidation with chromium (VI) oxide in glacial acetic acid. Using these methods, spirodilactones in which adjacent Z groups form a Z" ring system inertly substituted at the 3-, 3,5-, 3,4,5- or 3,4,5- and 6-positions can be prepared. Inert ring substituents include halogen, haloalkyl, alkyl, alkoxy, alkythio, tertiary-amino, tertiary-aminoalkyl, in which each alkyl group has up to 10 carbon atoms, preferably 4 carbon atoms, or aryloxy of up to 10 carbon atoms and 1 to 2 rings.

The hydroxy-containing primary amino compound(s) with which the spirodilactam precursor reacts are of a variety of chemical structures. The precise nature of the group that links the hydroxy group and the amino group, as well as the group to which the primary amino group is attached in the hydroxy-free primary amino compound, is not critical provided that at least three carbon atoms separate the amino group from any hydroxyl group and the group does not provide sufficient stearic hindrance to preclude reaction of the amino group with the spirodilactam precursor. The linking group is therefore suitably aromatic (suitably arylene) or mixed (cyclo)aliphatic and aromatic and is hydrocarbyl or is substituted-hydrocarbyl with any atoms other than carbon and hydrogen being present as inert substituents such as middle halo or as divalent portions of the linking groups. In one embodiment the primary amino compound is what is commonly termed a "large molecule" and is an oligomer, prepolymer or polymer which is functionalized to include a primary amino group and optionally a hydroxyl group. A preferred class of primary amino compounds, however, has up to 30 carbon atoms and up to 4 aromatic rings, inclusive, and is represented by the formula VIII

H₂N—R—(X—R')ᵣ—OH (·HY)ₘ     (VIII)

wherein R independently is an aromatic group of up to 10 carbon atoms, R- is an aliphatic, cycloaliphatic or aromatic group of up to 30 carbon atoms, inclusive, and of 1 to 2 rings when any rings are present and which when two rings are present incorporates said rings as fused or connected by X; each m and r is independently 0 or 1; X is a direct valence bond, an alkylene group of up to 8 carbon atoms, inclusive, oxy, thio, sulfonyl, carbonyl, dioxyphenylene, 2,2-bis(oxyphenyl)propane, dioxydiphenylene; and HY is an acid which forms a salt with the amine, including both inorganic and organic acids which do not interfere with the reaction, such as hydrohalogenic acids, for example, hydrochloric and hydrobromic, sulfur acids, for example, surfuric or sulfonic, phosphorus acids, for example, phosphoric or phosphonic, and carboxylic acids, for example, oxalic and the like. Preferably, Y is halogen e.g., fluorine, chlorine, bromine or iodine and especially chlorine or bromine.

Illustrative of the primary amino compounds of the above formula VIII are p-aminophenol 1-amino-5-hydroxynaphthalene, 4-aminophenyl 3-hydroxyphenyl ether, 4-amino-1-hydroxbiphenyl, 2-hydroxypropyl 4-aminophenyl ketone, m-aminophenol, 1-(4-hydroxyphenyloxy)-3-(3-aminophenyloxy)benzene, 2-(3-hydroxyphenyloxyphenyl)-2-(2-aminophenoloxyphenyl)propane, 5-(4-aminophenyl)-1-pentanol, (4-aminophenyl)(3-hydroxyphenyl)methane, 2-(4-aminophenyl)-2-(4-hydroxyphenyl)propane, 4-amino-3-chlorophenol, 4-amino-o-cresol, 4-(2-aminoethyl)-phenol and the like or salts thereof.

The compounds wherein the R and R' groups present in the molecule are aromatic are preferred over the primary amino compounds wherein an aliphatic R' group is present, especially those primary amino compounds which are otherwise hydrocarbyl and wherein r is 0. The aminophenols are a preferred class of hydroxy-containing primary amino compounds, particularly p-aminophenol.

The hydroxy-containing primary amino compound and the spirodilactam precursor react in a molar ratio of 2:1 although in practice reactant ratios from about 8:1 to about 1:1.5 are satisfactory. Reactant ratios that are substantially stoichiometric are preferred. Reaction is conducted in a liquid phase solution in an inert reaction diluent such as an N-alkylamide, e.g., N,N-dimethylformamide, N,N-dimethylacetamide or N-methyl-2-pyrrolidone. Reaction takes place under reaction conditions at an elevated temperature, typically from about 80° C. to about 250° C. The reaction pressure should be sufficient to maintain the reaction mixture in a liquid phase. Such pressures are up to about 20 atmospheres. Subsequent to reaction the spirodilactam bisphenol product of formula I is recovered from the product mixture by conventional methods such as solvent removal, precipitation and chromatographic separation. Recovery of the spirodilactam product is not required, however, and particularly in cases where substantially stoichiometric quantities of reactants were employed the spirodilactam may be reacted further in situ without isolation.

Bis(nitroimide)

The dihydroxyaryl-spirodilactam salt is reacted according to the process of the invention with a bis(nitroimide). Such imides are known in the art or can be prepared by reacting a primary diamine with a nitro-dicarboxylic acid anhydride.

The primary diamine is reacted in the process of the invention with a nitro-dicarboxylic acid anhydride having up to 30 carbon atoms wherein each of two separate carbon atoms is substituted with a part of an anhydride group, i.e., part of a

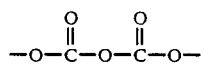
$$-O-\overset{O}{\underset{\|}{C}}-O-\overset{O}{\underset{\|}{C}}-O-$$

group. Each of the two carbon atoms is adjacent to another carbon atom so substituted and no carbon atom has more than one of such substituents.

By primary diamine is meant an organic compound having two primary amino groups, i.e., —NH₂ groups, as carbon atom substituents. While the reaction to produce the polymers of the invention will take place with a variety of primary diamines having a variety of structures, best results are obtained in the process of the invention if the two amino groups are not located on adjacent carbon atoms, that is, at least one carbon atom separates the two atoms on which the two amino groups are substituents. One such class of primary diamines comprises diamines of up to 30 carbon atoms inclusive which are represented by the formula IX $$H_2N-R'-(X'-R')_r-NH_2 \quad (IX)$$

wherein R' is an organic radical of up to 30 carbon atoms, inclusive, and is aliphatic, cycloaliphatic or is aromatic of from 1 to 2 aromatic rings, inclusive, which, when two rings are present, incorporates said rings as fused or connected by X' wherein X' is a direct valence bond or X' is alkylene of up to 8 carbon atoms, inclusive, oxy, thio, sulfonyl, carbonyl, dioxyphenylene, 2,2-di(oxyphenyl)propane, di(oxyphenyl) sulfone, or dioxydiphenylene, with the proviso that the two amino substituents are not located on adjacent carbon atoms. R' is preferably hydrocarbyl that is, contains only atoms of carbon and hydrogen besides the other atoms of divalent linking groups, or is substituted hydrocarbyl additionally containing other atoms as inert, monovalent substituents of carbon atoms, for example, halogen atoms, preferably middle halogens, r is 0 or 1.

Illustrative of alkylene-containing diamines of the above formula IX are trimethylenediamine, tetramethylenediamine, hexamethylenediamine, octamethylenediamine 1,7-diamino-4-methyloctane, 1,4-diaminocyclohexane, di(4-aminocyclohexyl)methane, dodecamethylenediamine and 1,6-diamino-3,4-diethylhexane. Arylene diamines of the above formula IX include 1,4-phenylenediamine, 2,4-toluenediamine, 4,4'-diaminobiphenyl, 1,5-diaminonaphthalene, di(3-aminophenyl) ether, di(4-aminophenyl)methane. 2,2-di(3-amino-4-methylphenyl)propane, di(4-amino-2-ethylphenyl) sulfone, di(3-amino-4-chlorophenyl) ketone, di(2-aminophenyl) sulfide, 1,3-di(3-aminophenyloxy)benzene, 2,2-di(4-aminophenyloxyphenyl)-propane and 4,4'-di(4-aminophenyloxy)biphenyl. The preferred primary diamines are those of the above formula IX where R is divalent arylene and which are otherwise hydrocarbyl except for any additional atoms of divalent linking groups. Particularly preferred are the di(aminophenyl)alkanes, such as 1,3-di(amino)phenylene or di(4-aminophenyl).

A wide variety of bis(nitroimide) compounds known in the art are useful in the process of the invention but a preferred class of such compounds is represented by the formula V

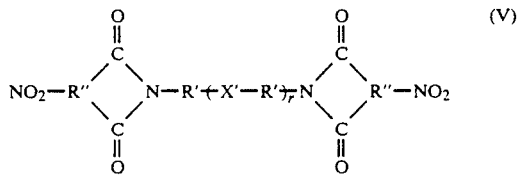

wherein R', X' and r are previously defined and R" is a divalent arylene group of from 6 to 10 carbon atoms and 1 to 2 rings, preferably phenylene, naphthalene or the like. The bis(nitroimide) compound is therefore aliphatic or aromatic including mixed aliphatic and aromatic, is acyclic or cyclic or mixed acyclic and cyclic, and is otherwise hydrocarbyl containing only atoms of carbon and hydrogen besides the nitro functions and the oxygens of the carboxylic functions or is non-hydrocarbyl containing additional atoms as divalent linking groups or as monovalent carbon atom substituents. Preferably R' is phenylene, X is oxy and r is 0 or 1.

Illustrative of the nitro-dicarboxylic acid anhydrides are aromatic dicarboxylic acid compounds such as 3-nitrophthalic anhydride, 3,4-nitrophthalic anhydride, 1-nitronaphthenedicarboxylic anhydride, 2-nitrophthalic anhydride and the like, including those disclosed in U.S. Pat. No. 3,838,097, the disclosures of which are incorporated herein by reference. The nitrodicarboxylic anhydrides are commercially available or are prepared by known methods, such as nitration of the anhydride using procedures described in "Organic Synthesis," Vol. 1, Wiley (1948), page 4080.

In general, the bis(nitroimide) compounds of the above formula V wherein r is 0 are preferred as are bis(nitroimide) compounds which are hydrocarbon except for the oxygens of the carboxylic functions and divalent linking groups. Aromatic bis(nitroimide) compounds are a preferred class of reactants in the process of the invention, particularly bis(nitrophthalimide) and bis(nitrophthalimide phenyl) ether.

Dihydroxyphenyl) Compound

The optional reactant in the process of the invention is an alkali metal salt of a di(hydroxyphenyl) compound of up to 25 carbon atoms. A considerable variety of such di(hydroxyphenyl) compounds are useful as optional components of the polycarbonate polymers of the invention. Illustrative of such compounds include dihydroxybenzenes such as hydroquinone and resorcinol, dihydroxynaphthalenes, such as 2,7-dihydroxynaphthalene and 5-dihydroxynaphthalene. The preferred optional components represented by the formula X

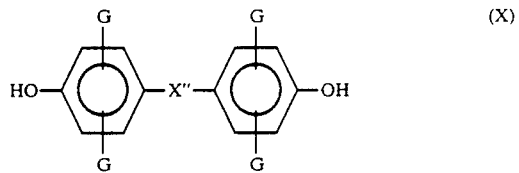

wherein X" is a direct valence bond or X" is alkylene of up to 8 carbon atoms, inclusive, oxy, thio, sulfonyl or carbonyl and G independently is hydrogen, alkyl, preferably lower alkyl of up to 4 carbons atoms, or halo, preferably the middle halogens chloro or bromo. Illustrative of the di(hydroxyphenyl) compound of formula X is 2,2-di(4-hydroxyphenyl)propane, 2,2-di(4-hydroxy-3-methyl-phenyl)propane, 2,2-di(4-hydroxy-3-chloro-5-methyl-phenyl)propane. 2-(4-hydroxyphenyl)-phenyl)propane, 2-(4-hydroxyphenyl)-2-(4-hydroxy-3-chloro-5-methyl-phenyl)propane. 2-(4-hydroxyphenyl)-2-(4-hydroxy-3,5-di-bromophenyl)propane, di(4-hydroxy-3-chlorophenyl) sulfone, (4-hydroxyphenyl) (4-hydroxy-3,5-dibromo-phenyl) ether, 4,4-dihydroxybiphenyl, di(4-hydroxyphenyl) ketone and di(4-hydroxy-3-methyl-phenyl) sulfide or position isomers thereof. The compounds of the above formula X wherein each G is hydrogen or halo and X" is 2,2-propylene are preferred and the compound 2,2-di(4-hydroxyphenyl)propane, also referred to as bisphenol A or BPA, is a preferred member of the class of di(hydroxy-phenyl) compounds. These compounds are known or are produced by known methods.

The invention is further illustrated by the following Illustrative Embodiments which should not be construed as limiting the invention.

Illustrative Embodiment I

A mixture of 6.76 g (0.2 mole) of 1,6-di(4-hydroxyphenyl)-1,6-diazaspiro[4.4]nonane-2,7-dione 3.04 g (0.022 mole) of potassium carbonate, 50 ml of toluene and 100 ml of N,N-dimethylacetamide was placed in a 250 l 3-necked round-bottomed flask. The mixture was warmed to 150°-160° C. and maintained for 6 hours as water was removed by azeotropic distillation. The resulting mixture was then cooled to 100°-110° C. and 11.0 g of bis(nitrophthalimidephenyl ether) (92% 4-nitro and 8% 3-nitro) was added. The reaction temperature was raised to 150° C. and held for 6 hours. After cooling, the mixture was poured into 1 liter of water. The filtered product was washed with water/methanol and dried. The poly(etherimide) polymer had a glass transition temperature of >300° C. and the nuclear magnetic resonance spectra were consistent with the structure

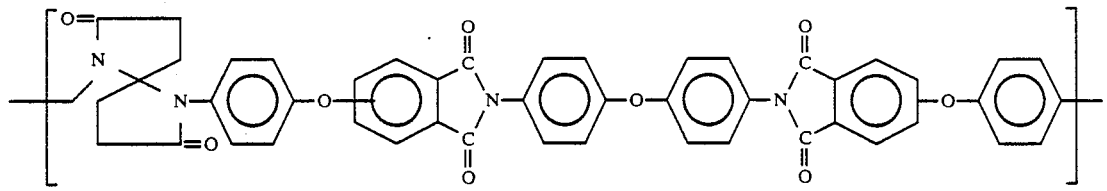

Illustrative Embodiment II

When a polymer was produced by the process of Illustrative Embodiment I but substituting a bis(nitrophthalimide)benzene, the resulting poly(etherimide) polymer had a glass transition temperature of >300° C.

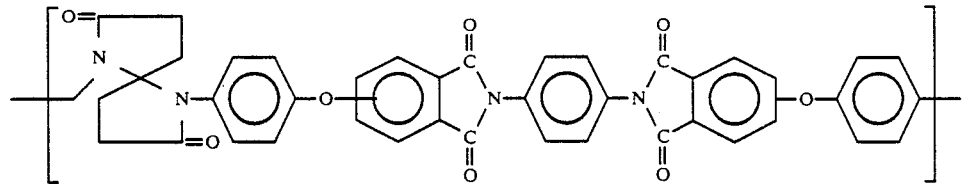

What is claimed is:

1. A process of producing a poly(etherimide) polymer by contacting under polymerization conditions in liquid phase reaction diluent
   (1) a dihydroxyaryl-spirodilactam alkali metal salt of up to 60 carbon atoms, inclusive, with
   (2) a bis(nitroimide) compound of up to 30 carbon atoms wherein a nitro group is located on each imide substituent and with or without
   (3) an alkali metal salt of a di(hydroxyphenyl) compound of two rings.

2. The process of claim 1 wherein the bis(nitroimide) compound is represented by the formula V

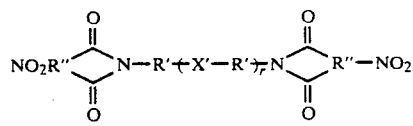

wherein R' is a divalent aliphatic, cycloaliphatic or aromatic group which, when two rings are present, are connected by X wherein X is a direct valence bond or X is alkylene of up to 8 carbon atoms, inclusive, oxy, thio, sulfonyl, carbonyl, dioxyphenylene, 2,2-di(oxyphenyl)propane, dioxyphenyl sulfone or dioxyphenylene, r is 0 or 1; X' is a direct valence bond or X' is alkylene of up to 8 carbon atoms, inclusive, oxy, thio, sulfonyl, carbonyl, dioxyphenylene, 2,2-di(oxyphenyl)propane, di(oxyphenyl) sulfone or dioxydiphenylene and R" is a divalent arylene group of from 6 to 10 carbon atoms and 1 to 2 rings.

3. The process of claim 2 wherein the dihydroxyarylspirodilactam salt is selected from a salt of a diaza [4.4] spirodilactam of the formula I

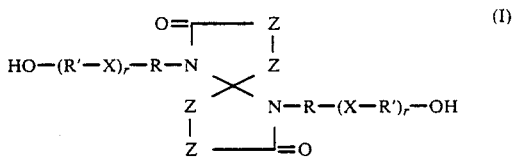

wherein Z independently is >(Z')$_2$ in which Z' independently is hydrogen, lower alkyl, lower halogen or an aryl group of up to 10 carbon atoms or Z is such that two adjacent Z moieties taken together form a ring system Z" of 1 to 3 rings, each ring having from 5 to 7 ring atoms, inclusive, up to two of which are heteroatoms selected from nitrogen, oxygen or sulfur with the remainder of the ring atoms being carbon atoms, there being up to 15 carbon atoms in each Z", two of which form a bridge between the central spiro carbon atom and a carbon atom of a carbonyl function; R is an aromatic group of up to 10 carbon atoms and 1 to 2 aromatic rings; R' is a divalent aliphatic, cycloaliphatic or aromatic group of up to 30 carbon atoms; X is a direct valence bond, or X is alkylene of up to 8 carbon atoms inclusive, oxy, thio, sulfonyl, carbonyl, dioxyphenylene, 2,2-di(oxyphenyl)propane, dioxyphenyl sulfone or dioxydiphenylene and r is 0 or 1.

4. The process of claim 3 wherein in the bis(nitroimide) compound of formula V each R' is an aromatic group.

5. The process of claim 4 wherein each r is 0.

6. The process of claim 5 wherein the bis(nitroimide) compound is bis(nitrophthalimide)benzene.

7. The process of claim 5 wherein in formula I each Z is >C(Z')$_2$.

8. The process of claim 4 wherein the dihydroarylspirodilactam salt is a salt of 1,6-di(4-hydroxyphenyl)-1,6-diazaspiro[4.4]nonane-2,7-dione.

9. The process of claim 5 wherein in formula I adjacent Z moieties are Z".

10. The process of claim 9 wherein each Z" is benzo.

11. A linear alternating poly(etherimide) polymer wherein divalent moieties of a bis(imide) of up to 30 carbon atoms inclusive selected from aliphatic moieties or alicyclic aromatic moieties of from 1 to 2 rings, alternate randomly with moieties of a dioxyaryl-substituted 1,6-diaza [4.4] spirodilactam of up to 30 carbon atoms and with or without moieties of a dioxyphenyl compound of two rings.

12. The polymer of claim 11 having a first repeating segment of the formula III

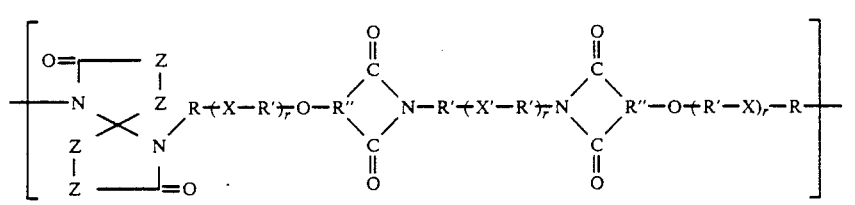

with or without a second repeating segment of the formula IV

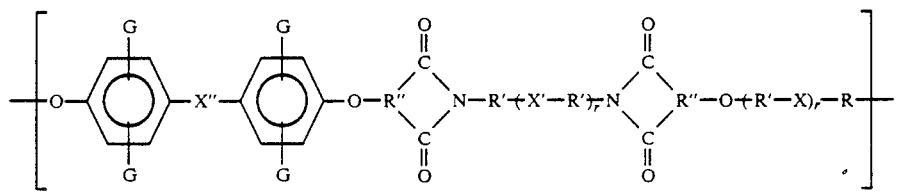

wherein Z independently is $>C(Z')_2$ in which Z' independently is hydrogen, lower alkyl, lower halo or phenyl, or Z is such that two adjacent Z groups taken together form a ring system Z" of from 1 to 3 rings, each ring of 5 to 7 ring atoms, up to two of which are heteroatoms selected from nitrogen, oxygen or sulfur atoms with the remainder of the ring atoms being carbon atoms, there being up to 15 carbon atoms in each Z", two of which ring atoms connect the carbon atoms connected by the adjacent carbon atoms; R' is an aliphatic group of up to 30 carbon atoms or a cycloaliphatic or aromatic group of up to 30 carbon atoms and from 1 to 2 rings, which when two rings are present incorporates said rings as fused or connected by X, R is an aromatic group of up to 10 carbon atoms and 1 to 2 rings; R" is a divalent arylene group of from 6 to 10 carbon atoms and 1 to 2 rings; r is 0 or 1; X' and X, each independently is a direct valence bond or X is alkylene of up to 8 carbon atoms, oxy, thio, sulfonyl, carbonyl, dioxyphenylene, 2,2-di(oxyphenyl)propane or dioxydiphenylene; X" is a direct valence bond or X" is alkylene of up to 8 carbon atoms, oxy, thio, sulfonyl or carbonyl; and G is hydrogen, lower alkyl, chloro or bromo.

13. The polymer of claim 12 wherein R is divalent arylene which, when 2 aromatic rings are present, are fused or connected by X.

14. The polymer of claim 13 wherein each Z is $>C(Z')_2$.

15. The polymer of claim 14 wherein Z' is hydrogen.

16. The polymer of claim 15 wherein each r is 0.

17. The polymer of claim 16 wherein R' is a phenylene group.

18. The polymer of claim 16 wherein r is 1 and X is oxy.

19. The polymer of claim 18 wherein R' is a phenylene group.

20. The polymer of claim 19 wherein R is a phenylene group.

21. The polymer of claim 13 wherein adjacent Z groups are Z".

22. The polymer of claim 21 wherein Z" is benzo.

23. The polymer of claim 22 wherein R is a phenylene group.

24. The polymer of claim 23 wherein R' is a phenylene group.

25. The polymer of claim 24 wherein r is 0.

26. The polymer of claim 24 wherein r is 1 and X is oxy.

27. The polymer of any one of claims 12, 14 or 21 which is a polymer of the first repeating segment III.

28. The polymer of any one of claims 12, 14 or 21 which is a polymer of the first and second repeating segments III and IV.

29. The polymer of claim 28 wherein X" is 2,2-propylene and each G is hydrogen.

* * * * *